3,836,631
METHOD OF MAKING URANIUM
SESQUICARBIDE
Hiroaki Tagawa and Kimio Fujii, Naka-gun, Japan, assignors to Eiji Munekata, Tokyo, Japan
No Drawing. Filed July 18, 1972, Ser. No. 272,794
Claims priority, application Japan, July 19, 1971,
46/53,107
Int. Cl. C01g 43/00
U.S. Cl. 423—256                                 4 Claims

ABSTRACT OF THE DISCLOSURE

This invention relates to a method of making uranium sesquicarbide $U_2C_3$ by mixing uranium dicarbide $UC_2$ with metal oxide and subjecting the mixture to heating vacuum.

BACKGROUND OF THE INVENTION

Hitherto, uranium carbide has been made by arcmelting uranium metal and carbon together, or by heating a mixture of uranium oxide and carbon together at high temperature generally between 1200° C. and 2000° C. However, uranium monocarbide UC or uranium dicarbide $UC_2$ or the mixture of them is produced depending on the initial mixing ratio of uranium and carbon.

This mixture is then subjected to further treatment in order to obtain uranium sesquicarbide. For example, it must be maintained at temperatures such as between 1100° C. and 1700° C. for extended periods of time under vacuum.

With these methods, however, it has been very difficult to obtain uranium sesquicarbide. The sesquicarbide composed of 7.04 weight percent carbon made by these prior methods always contain a mixture of uranium monocarbide and uranium dicarbide. The reason has been said that the small quantity of oxygen contained in carbide obstructs the formation of uranium sesquicarbide.

In brief, all of the methods employed heretofore to obtain uranium sesquicarbide are expensive and difficult to perform and require extended periods of time to complete the reaction. These methods consist of heating uranium carbide under a vacuum for a long period of time providing external force to the carbide while heating, or precipitating the uranium sesquicarbide gradually by heating and cooling the carbide around the transformation temperature of uranium sesquicarbide.

SUMMARY OF THE INVENTION

The object of this invention is to provide a method for making uranium sesquicarbide easily with less cost and in a shorter period of time.

Aiother object of this invention is to provide a method for making uranium sesquicarbide which comprise the steps of heating a mixture of uranium dicarbide and metal oxide having high vapor pressure at high temperatures, under vacuum or in an atmosphere of inert gas.

DESCRIPTION OF THE PREFERRED EMBODIMENT

The first embodiment of this invention will be described below. First, uranium dicarbide composed of 9.02 weight percent carbon including 0.46 weight percent free carbon and 90.95 weight percent uranium and magnesium oxide are mixed in the ratio of 13.93:1 by weight. Second, the mixture is molded into a cylinder of 7 mm. in diameter and 7 mm. in height. Then this molded mixture is put into a graphite crucible and heated to 1700° C. under high vacuum such as $10^{-6}$mm. Hg. After heating for two hours, uranium sesquicarbide of 7.05 weight percent carbon is obtained. By X-ray diffraction, this product is affirmed to be single phase of uranium sesquicarbide and there is no free carbon in it.

The second embodiment of this invention will be described below. First, uranium dicarbide composed of 9.02 weight percent carbon including 0.46 weight percent free carbon and 90.95 weight percent uranium and zinc oxide are mixed in the ratio of 6.90:1 by weight. Second, the mixture is molded into a cylinder of 7 mm. in diameter and 7 mm. in height. Then this molded mixture is put into a quartz reaction tube and heated to 900° C. in high vacuum such as $10^{-4}$mm. Hg. After heating for 7 hours, uranium sesquicarbide of single phase is obtained. Zinc condenses at the cold place of the reaction tube and can be easily separated.

Briefly stated, the method of this invention is characterized by the following processes; uranium dicarbide in single phase or uranium dicarbide with free carbon is mixed with a metal oxide such as magnesium oxide or zinc oxide, and the mixture is heated to the temperature below 1700° C. in vacuum or in the atmosphere of inert gas to produce uranium sesquicarbide. The mixture may be heated in powder form or may be heated after molding. The metal oxide may be an oxide of magnesium, strontium, barium, calcium, zinc, cadmium, aluminum and other metals which have a high vapor pressure at high temperature.

The reaction of uranium dicarbide and metal oxide, for example magnesium oxide, is disclosed by the following equation of reaction:

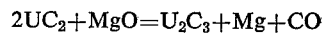

$$2UC_2 + MgO = U_2C_3 + Mg + CO$$

The reaction products of magnesium and carbon monoxide are removed from the reaction while in the gas phase.

In practicing the invention herein it was found that uranium sesquicarbide can be obtained at a practicable reaction rate with above mentioned processes in the temperature range in which uranium sesquicarbide exists in stable form, that is below 1700° C. However, from the process heretofore known uranium sesquicarbide could not be produced in high yield by the reaction with oxide. Further, it was reported that the presence of oxide obstructs the formation of uranium sesquicarbide.

According to this invention, uranium dicarbide is decarbonized by a metal oxide to form uranium carbide in the composition of uranium sesquicarbide, while metal oxide decomposes into metal vapor and carbon monoxide. The carbide which has the composition of uranium sesquicarbide is composed of uranium sesquicarbide or the mixture of uranium monocarbide and uranium dicarbide. This carbide mixture changes into uranium sesquicarbide immediately. The free carbon in the carbide reacts with the metal oxide to form metal vapor and carbon monoxide. Metal vapor precipitates at colder places of the reactor and can easily be separated.

The reaction temperature may be any temperature below 1750° C. In case of some metal oxide, uranium sesquicarbide can be produced even below 1000° C. The reaction atmosphere can be either vacuum or inert gas.

The composition of the products may be between 4.8 and 9.0 weight percent carbon according to the initial mixing ratio of carbon and metal oxide. It is preferable to produce stoichiometric uranium sesquicarbide composed of 7.04 weight percent carbon, however, the composition may be varied depending on its object.

As described above, with the method of this invention, uranium sesquicarbide is produced from uranium dicarbide easily in one process. According to this method it is possible to form uranium sesquicarbide at temperatures below 1700° C. which is at much lower temperatures than heretofore employed. Also, the reaction period is only several hours and is of much shorter duration than the periods employed in the prior methods. Further, with the method of this invention the metal vapor which arises in this process can be easily separated.

We claim:
1. A method for making uranium sesquicarbide which comprises the steps of:
   providing a mixture of uranium dicarbide and a metal oxide having a high vapor pressure when subjected to elevated temperatures, said metal oxide being selected from the group consisting of oxides of magnesium, calcium, strontium, barium, cadmium and aluminum;
   subjecting said mixture to a temperature of not more than 1750° C. while maintaining a vacuum of about $10^{-4}$ mm. Hg whereby a stable uranium sesquicarbide is formed while metal vapors and carbon monoxide gas is separated from the mixture.
2. The method of claim 1 wherein the metal oxide is magnesium oxide.
3. The method of claim 1 wherein the metal oxide is zinc.
4. The method of claim 2 wherein the temperature is maintained in a range of from 900° C. to 1700° C.

References Cited
UNITED STATES PATENTS

| | | | |
|---|---|---|---|
| 3,488,291 | 1/1970 | Hardy et al. | 252—301.1 R |
| 3,398,098 | 8/1968 | Hanson | 252—301.1 R |
| 3,347,749 | 10/1967 | Jordan | 252—301.1 R |
| 3,392,005 | 7/1968 | Hanson | 252—301.1 R |

OTHER REFERENCES
Imoto et al.: *Studies on Uranium Dicarbide and Sesquicarbide,* in *Carbides in Nuclear Energy,* ed. by Russell et al., Macmillan & Co. Ltd., London, 1964.

BENJAMIN R. PADGETT, Primary Examiner

R. L. TATE, Assistant Examiner

U.S. Cl. X.R.

252—301.1 R; 264—.5